United States Patent [19]

Schneider

[11] 4,092,827

[45] June 6, 1978

[54] APPARATUS FOR AERIAL WATER ACQUISITION AND SUB-SEA AQUEDUCT

[76] Inventor: Gerald J. Schneider, 14923 Moorpark St., Sherman Oaks, Calif. 91403

[21] Appl. No.: 789,649

[22] Filed: Apr. 21, 1977

[51] Int. Cl.² .............................. F15B 1/06; B64B 1/50
[52] U.S. Cl. ................................. 60/398; 137/236 R; 239/14; 244/33; 290/52
[58] Field of Search .................... 60/398, 327; 239/14, 239/2 R; 244/33; 137/236 R, 236 OS

[56] References Cited

U.S. PATENT DOCUMENTS

| | | | |
|---|---|---|---|
| 2,894,268 | 7/1959 | Griebe | 137/236 X |
| 3,230,967 | 1/1966 | Castro | 137/236 |
| 3,467,013 | 9/1969 | Conner | 137/236 X |
| 3,658,278 | 4/1972 | Batchelor | 244/33 |
| 3,748,867 | 7/1973 | Hamri | 239/14 X |

*Primary Examiner*—Edgar W. Geoghegan
*Attorney, Agent, or Firm*—William H. Maxwell

[57] ABSTRACT

Apparatus for rain water conservation and sub-sea transport thereof, by means of funnels supported above the terrain and sea by balloon tethered to moored reservoirs with a duct fed penstock to a turbine driven generator for electrical power to drive submersible pumps that return the collected rain water to sea level from a well at the remote end of an aqueduct leading therefrom to the destination of use for said collected rain water.

37 Claims, 8 Drawing Figures

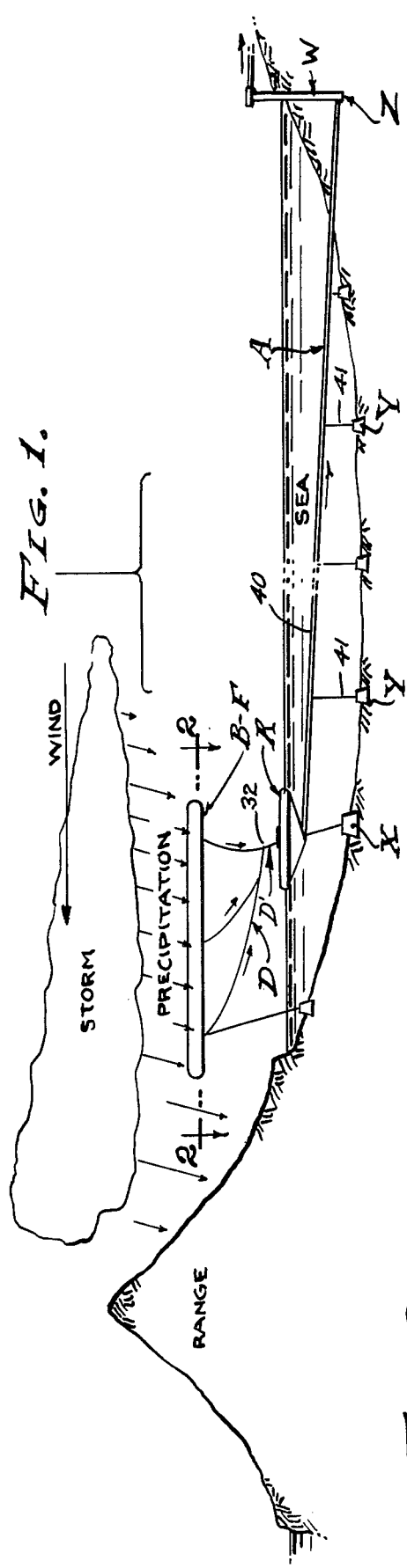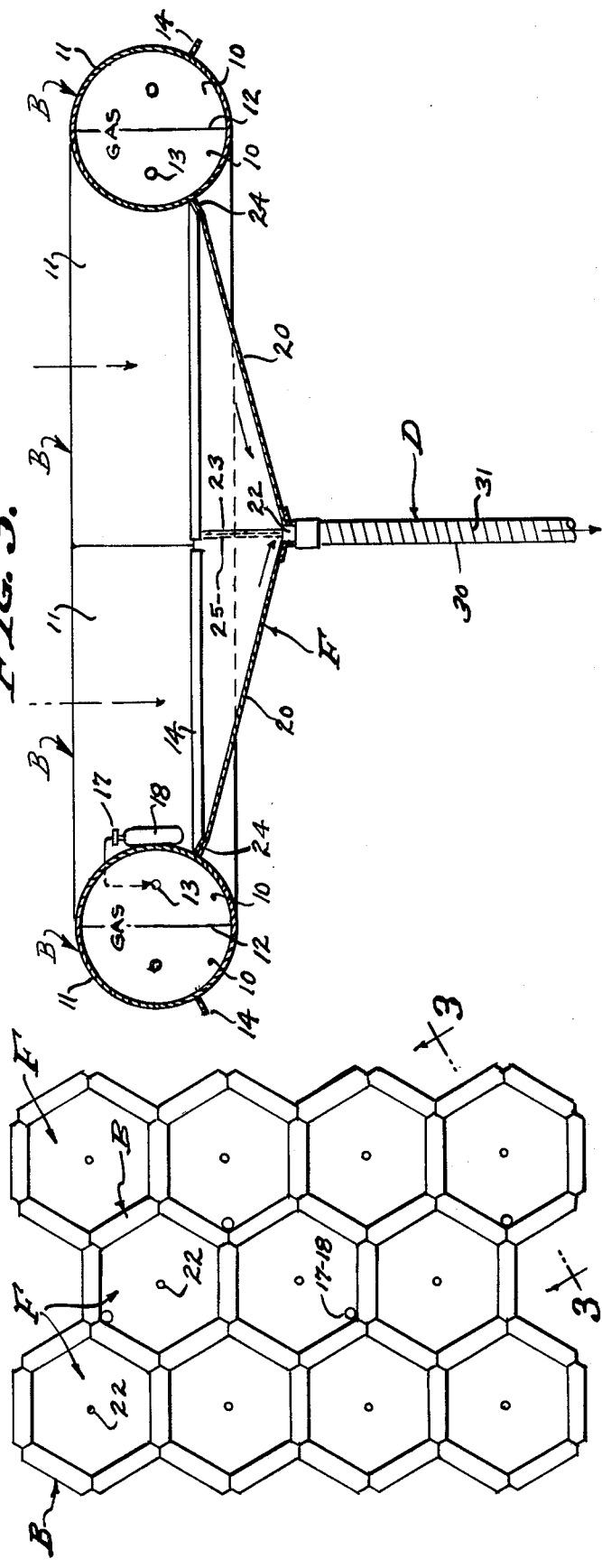

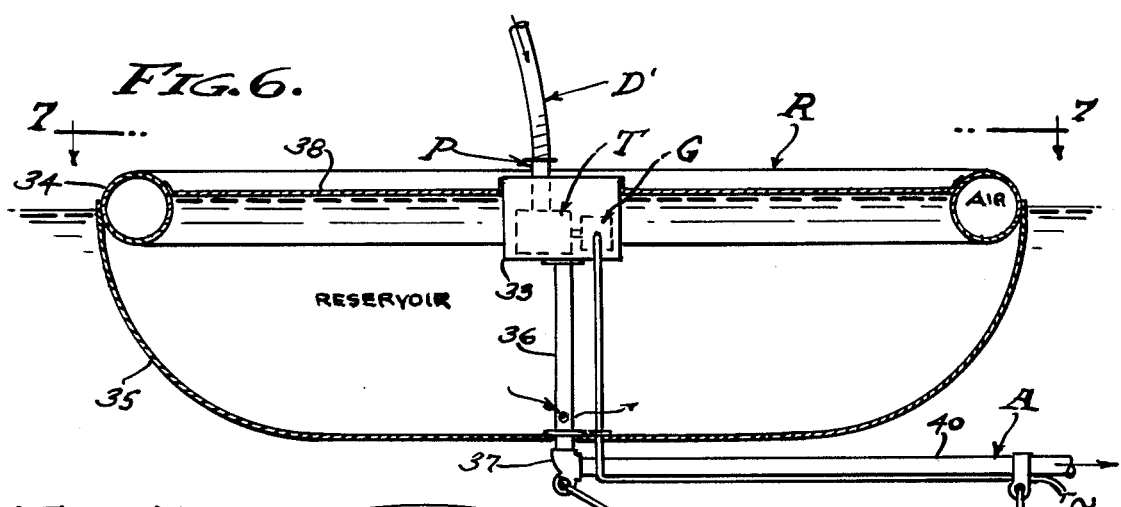
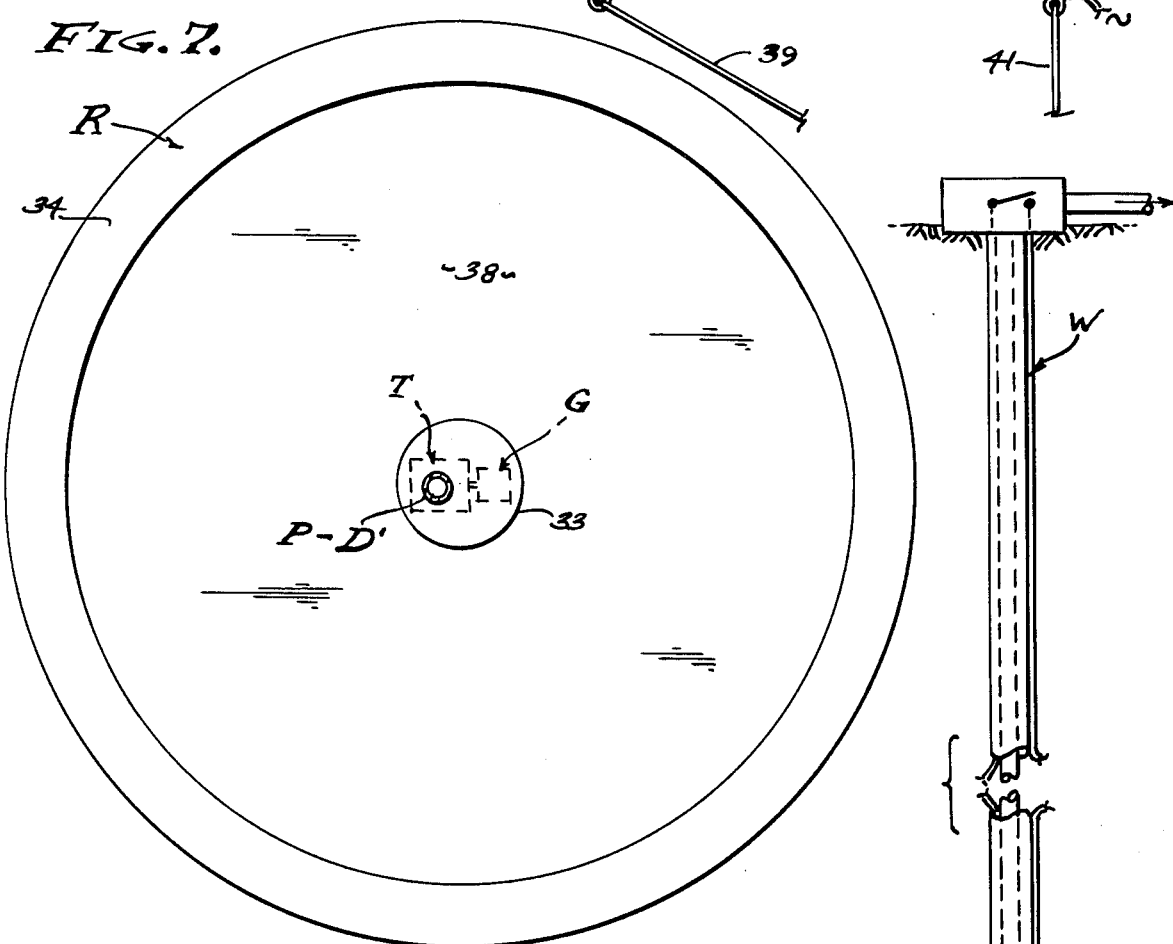
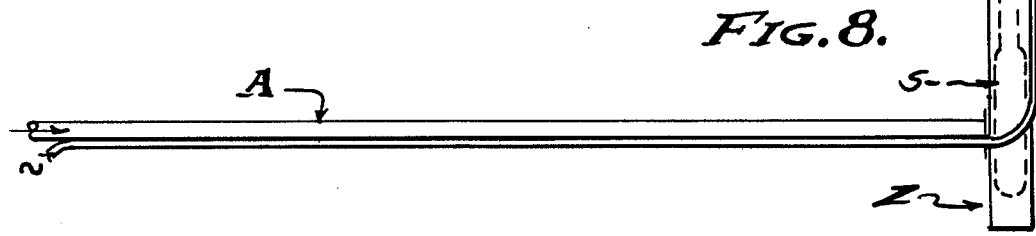

APPARATUS FOR AERIAL WATER ACQUISITION AND SUB-SEA AQUEDUCT

BACKGROUND

This invention relates to a system for collecting, storing and distributing rain water from areas where it is available to areas lacking an adequate supply. Meteorologically, moisture laden storms are moved by prevailing winds toward mountain ranges, as for example ranges that form islands at sea, causing an atmospheric condition that results in precipitation of rainfall on the windward side of the range and with very little if any rainfall on the leeward side of the range. Although the windward terrain can be used for collecting rainfall, all of that rainfall which precipitates into the sea is lost into the saline ocean waters. Rainfall emanates from cloud formations at various altitudes, and in the high altitudes and/or in the cold climate areas there will be ice, sleet and snow. However it is the tropical and semi-tropical areas and areas having a mild climate where rain water is developed at lower altitudes and with which this invention is concerned; it being a general object to provide aerial collection of rainfall over wide areas by means of captive balloons tethered to moorings and floating above the sea, and terrain if necessary, and supporting elevated funnels which intercept the rainfall directed thereby into storage for subsequent distribution.

The aerial support of funnels for collecting rain water is an object of this invention, and to this end a modular system of balloons is provided for the elevated placement of a multiplicity of funnels that intercept rainfall and direct it earthward with dispatch, so that the weight of water does not exceed the floating capability of the balloons. In practice, a single balloon configuration is utilized in hexagonal relationships with correspondingly configured funnels individually tethered by means of ducts for the immediate drainage of rain water collected as it gravitates earthward.

The storage of collected rain water is an object of this invention, and to this end the aforementioned ducts are manifolded to at least one or more floating cisterns isolating the same from the saline ocean waters and from which a reserve of fresh rain water can be drawn as circumstances require via an aqueduct or via shipping means such as tanker ships and/or barges.

The distribution of stored rain water is an object of this invention, and to this end the aforementioned aqueduct or shipping is provided with floating means to draw from the said floating cisterns, so as to supply shipping tankers and/or to supply an aqueduct suspended below sea level and positioned by moorings to extend to the inadequate area to be furnished with fresh potable water. Another object of this invention is the generation of hydraulic power by means of generators operated by the fall of waters from the substantial height of collection.

The balloon support is of modular construction, and to this end it is an object of this invention to provide a balloon module cooperatively combined with a funnel module, and all of which is joined together systematically to any augmentation thereof which may be found necessary. Further, each balloon module and/or funnel module is individually installed and/or replaceable as may be required; and all of which are fabricated of impervious sheets of plastic or the like with filaments directed for maximized strength and durability. Still another object of this invention is to provide flotation means in the form of a supply of gas at suitable pressure and low specific gravity relative to the atmosphere at the altitude of flotation. With the present invention, groups of balloon modules are interconnected to pressure regulated compressed gas cylinders that replenish the balloon modules so as to maintain full volume thereof.

SUMMARY OF THE INVENTION

There are known geographic locations which are conducive to rainfall, but which are lacking in terrain by which water can be impounded. This aerial system of balloons and funnels is tethered at such a geographic location to intercept rainfall and to impound the fresh rain water within reservoirs from which it can be withdrawn as desired. The balloons are lighter-than-air modules that relate one to the other in cooperative hexagonal formations from which a multiplicity of funnels depend so as to be tethered to moorings by ducts leading into said reservoirs at the ground and specifically floating upon the underlying sea. The gravitational effect of water is usefully employed by hydroelectric means to generate power, followed by storage thereof in floating reservoirs within which the potable waters are isolated from the surrounding saline sea waters. A feature is the perimeter construction of the reservoirs, which separates the waters of different specific gravity, the stored fresh water being drawn from the reservoirs by transportation means in the form of ships and/or barges or specifically the sub-sea aqueduct, all as hereinafter described.

DRAWINGS

The various objects and features of this invention will be fully understood from the following detailed description of the typical preferred form and application thereof, throughout which description reference is made to the accompanying drawings, in which:

FIG. 1 is a diagramatic illustration of the aerial water acquisition and sub-sea aqueduct of the present invention.

FIG. 2 is an enlarged plan view of the characteristic balloon supported funnel combination and taken as indicated by line 2—2 on FIG. 1.

FIG. 3 is an enlarged transverse sectional view of a single balloon and funnel unit and taken as indicated by line 3—3 on FIG. 2.

FIG. 6 is an enlarged sectional view of the reservoir shown in FIG. 1.

FIG. 7 is a plan view of the reservoir taken as indicated by line 7—7 on FIG. 6, and FIG. 8 is an enlarged sectional view of the well and submersible pump that delivers water at its destination.

PREFERRED EMBODIMENT

Figure 4:
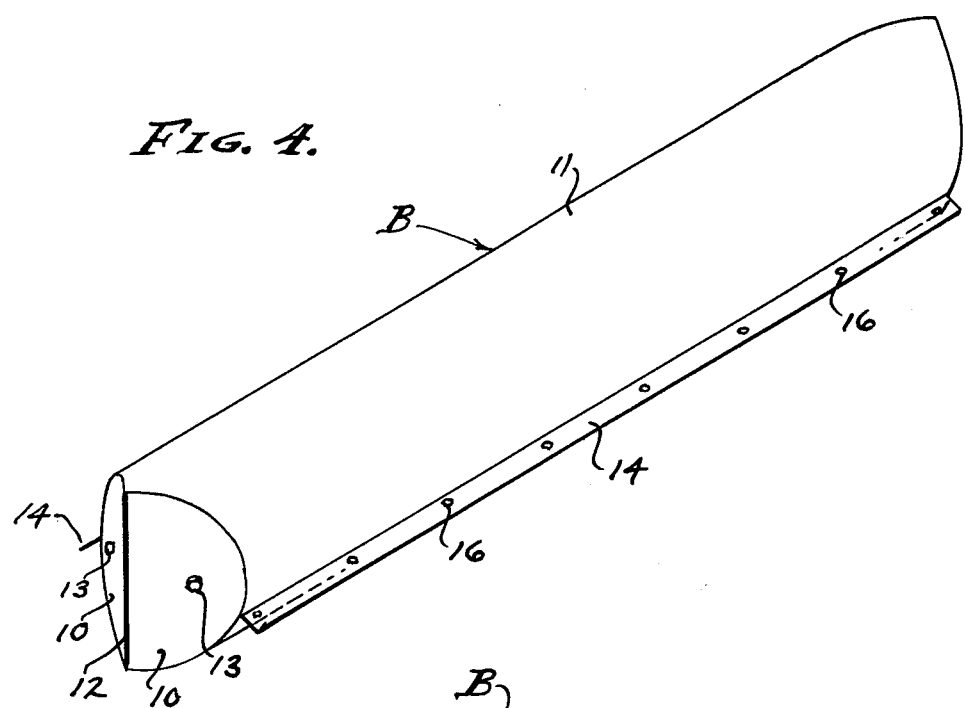
FIG. 4 is an enlarged perspective view of a modular balloon.
Figure 5:
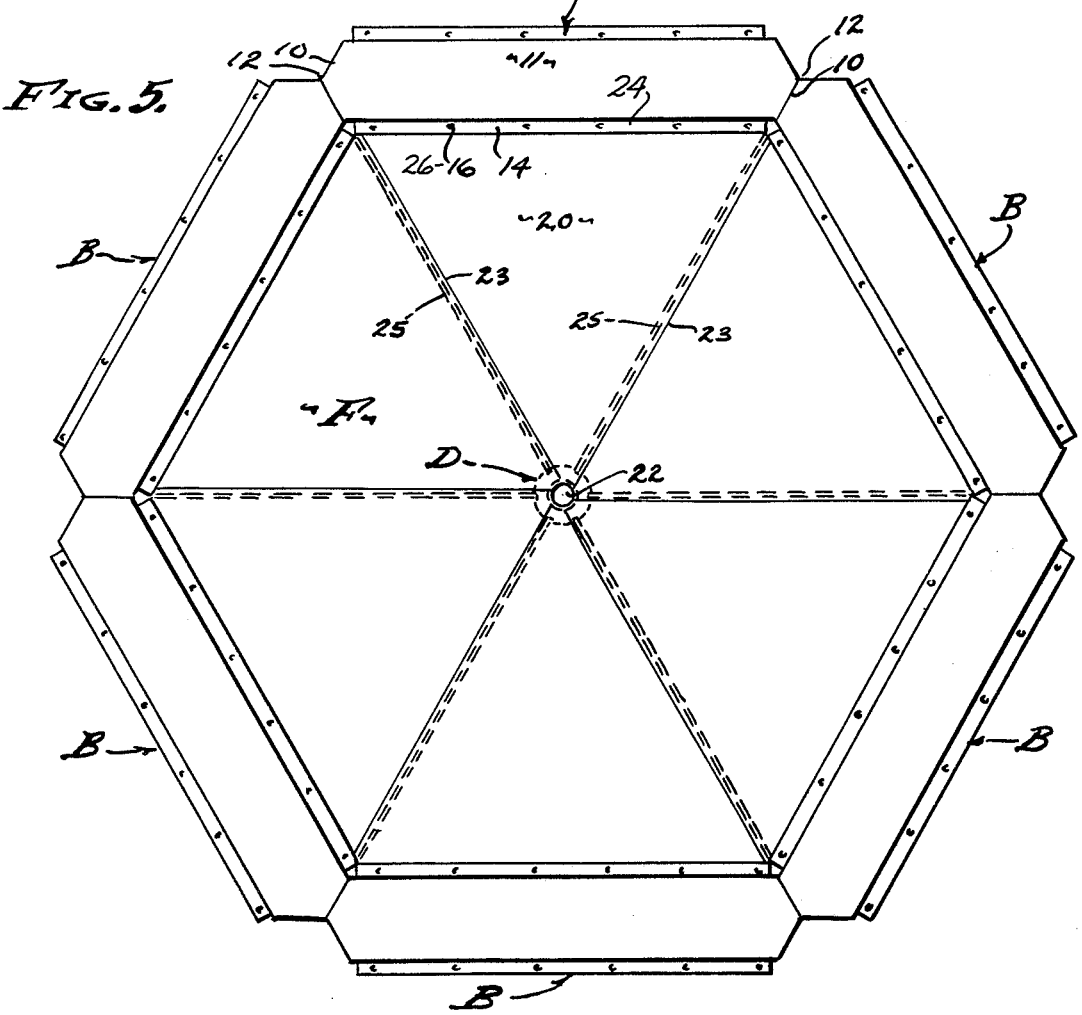
FIG. 5 is a plan view of one of the balloon and funnel units.

The aerial water acquisition and sub-sea aqueduct apparatus are combined herein for the conservation of rainfall in areas of availability and for delivery thereof to areas lacking an adequate supply. In accordance with this invention, there are funnels F supported by balloons B above the sea bordering terrain which produces atmospheric conditions resulting in rainfall. The balloons and funnels are modular for their cooperative assembly into a floating mat comprised of a multiplicity of basins disposed at an altitude above the terrain and sea, and tethered to moorings associated with cisterns or reservoirs R anchored in position. A feature is the immediate transfer of collected rainfall into the reservoirs via ducts D; and the fall thereof through the ducts is utilized to supply penstocks P at the entrance to hydraulic turbines T driving generators G. The aqueduct A is anchored to extend below sea level to the area of inadequate supply where it opens into a well W and the transported water is returned to and/or above sea level by a submersible pump S powered by the generators G.

The balloons B and funnels F are combined modularly to construct a multiplicity of hexagonal basins, but not to exclude triangular or square basins etc. if so desired. Preferably therefore, each balloon B is an envelope of cylinder form closed at its opposite ends by pairs of semi-circular walls 10 disposed in vertical planes radial to the center of the basin to be formed by the funnel F. In practice, the walls 10 are at 60° to the axis of the balloon envelope comprised of a cylindrical wall 11, with a vertical corner 12 where the walls 10 adjoin. In carrying out this invention, an inflation fitting 13 is provided at the center of each wall 10, and as shown there is a suspension flap 14 extending along opposite bottom sides of the cylinder wall 11, tied together internally by a horizontal curtain not shown. The flaps 14 are coextensive with the balloon cylinder and have a series of openings or fasteners 16 therealong to engage the funnel F next described.

The funnel F is of inverted pyramidal form to depend within the confines of a set of hexagonally related balloons B. Accordingly, the funnel F is comprised of six isosceles-shaped triangular panels 20, each with a base 24 coextensive with a flap 14 and with sides 23 extending downward and inward to a vertex opening 22. In practice, there are suspension cables 25 extending along the adjoining sides 23 to maintain the radial distance from each balloon intersection to the fitting which comprises the opening 22. The panels 20 are water proof sheets suspended by the margins of the bases 24 having a series of openings or fasteners 26 therealong to engage with the balloon openings or fasteners 16 respectively.

The balloon and funnel modules B and F, as hereinabove described, are assembled by attaching a balloon flap 14 to each of the six sides of a funnel F. As is clearly shown, the hexagonal pattern is repeatable so as to augment a mat thereof to the multiplicity of funnels-basins desired. The abutting end walls 10 are attached as by fasteners (not shown) along the corners 12 thereof, and the inflation fittings 13 are coupled for open communication between groups of balloons as may be desired. For example, and in accordance with this invention, the lifting gas is supplied to a group of interconnected balloons by a pressure regulating means 27 responsive to inflation pressure so as to discharge a gas bottle 18 coupled through a fitting 13 of one balloon, nominally 12 to 13 balloons per group, thereby automatically replenishing the lift gas as may be required. It will be seen that the modular limit of augmentation is unlimited.

The ducts D serve a dual purpose of fluid transport and of tethering the rain acquisition basins hereinabove described. That is, each duct D extends earthward from the fitting 22 to which the balloon interconnections (at walls 10) are tied by the cables 25, and through which the acquired rain water is free to discharge by gravity. In practice, the duct D is a light weight structure with a thin wall 31 reinforced circumferentially by helical ribbing of spring wire 30 or the like and reinforced longitudinally by filaments of fiber or the like. In practice, the ducts D are manifolded together, as for example in groups of three, by means of a triple-Y fitting 32 coupled thereto and into a duct D' continuing to an anchor point at the reservoir R to tether the said rain acquisition basins at the desired altitude; and as shown, moored through the reservoir R to an anchor X on the ocean floor.

The duct D' leads into the penstock P to operate the hydraulic turbine T supported by a buoy 33 establishing the center of a reservoir R. The penstock P discharges through the turbine T and into the reservoir R while turning the generator G for the manufacture of electrical power. In practice, there is a multiplicity of relatively small hydroelectric generator units T-G, discharging into a like number of cisterns or reservoirs R floating at sea from the mooring anchors X as next described.

The reservoir R floats upon the sea underlying the above described rain acquisition mat, to isolate the acquired fresh rain water from the surrounding saline sea water. As shown, the reservoir R is circular and comprised of a floating ring 34 that supports an inflatable bottom membrane 35 within which the acquired water is confined. The center of the bottom membrane 35 is distended by an anchor link 36, so that a sump is established for drainage and at which point there is a discharge fitting 37. In practice, the reservoir chamber is enclosed by a surface membrane 38 that extends from ring 34 to and centers the buoy 33, and all of which isolates the fresh water of less specific gravity from the saline sea water of greater specific gravity. As shown, an anchor line 39 extends to anchor X from the fitting 37.

The aqueduct A is anchored to extend below sea level to the destination of use for said acquired rain water, and in accordance with this invention is a floating pipe 40 moored in position by anchors Y spaced therealong. Accordingly, the aqueduct A comprises the pipe 40 that is buoyant so as to rise from its anchors Y and secured at a decline by anchor lines 41. The material of the buoyant pipe 40 is of less specific gravity than the surrounding sea water and is impervious thereto, and when filled with the fresh water of less specific gravity it remains at its anchored declination so that the transported water gravitates to the remote terminus Z at which point the well W opens upwardly to sea level. As shown, the aqueduct pipe 40 carries power cables from the generators G, and the submersible pump S is operated thereby to lift the acquired water to the surface where it is delivered for use as circumstances require.

From the foregoing it will be seen that aerial acquisition of rain water is feasible with the augmented mat of funnels F supported by balloons B tethered to floating reservoirs R and into which the acquisition of rain water is immediately discharged. The fall of acquired water is by gravity within the confines of a penstock and through a hydroelectric unit T-G that discharges the acquired water into said reservoir R. Filling of the reservoir R distends its bottom membrane, and from the sump thereof the acquired water is drawn off into the aqueduct A to the terminus Z where the acquired water is delivered to the surface by a submersible pump S powered by the hydroelectric unit T-G. The number of rain acquisition basins and the number of reservoirs supplied thereby can vary as required, and all of which are manifolded into the aqueduct A as shown in the drawings. For example, in carrying out this invention 1 square mile of rain acquisition modules comprised of the funnels F elevated by the balloons B will intercept over 4 billion (4,014,489,600) square inches of precipitation; and since the average yearly rain fall is so great in areas such as the Hawaiian Islands, i.e. 360 inches, the annual acquisition in this example is about 1500 billion cubic inches of rain water for disposition as hereinabove described, a supply of approximately 6 ½ billion (6,493,506,400) gallons or 19,200 acre-feet of potable water.

Having described only a typical preferred form and application of my invention, I do not wish to be limited or restricted to the specific details herein set forth, but wish to reserve to myself any modifications or variations that may appear to those skilled in the art as set forth within the limits of the following claims.

I claim:

1. Apparatus for the acquisition of rain water and including, a funnel supported aerially by balloon means and together forming an elevated basin tethered at and over a reservoir and with a duct from said funnel to said reservoir for the immediate gravitation of acquired rain water into storage.

2. The apparatus for acquiring rain water as set forth in claim 1, wherein the duct tethers the elevated basin to the reservoir.

3. The apparatus for acquiring rain water as set forth in claim 1, wherein the funnel is of inverted pyramidal form depending to a vertex from which the duct extends, and supported aerially by balloon means at each side thereof.

4. The apparatus for acquiring rain water as set forth in claim 1, wherein the funnel is of inverted pyramidal form having six sides depending to a vertex from which the duct extends, and supported aerially by balloon means at each side thereof.

5. The apparatus for acquiring rain water as set forth in claim 1, wherein the funnel is of inverted pyramidal form depending to a vertex from which the duct extends, and supported aerially by separate balloon means at each side thereof.

6. The apparatus for acquiring rain water as set forth in claim 1, wherein the funnel is of inverted pyramidal form having six sides depending to a vertex from which the duct extends, and supported aerially by separate balloon means at each side thereof.

7. The apparatus for acquiring rain water as set forth in claim 1, wherein the funnel is of inverted pyramidal form depending to a vertex from which the duct extends to tether the elevated basin to the reservoir, and supported aerially by balloon means at each side thereof.

8. The apparatus for acquiring rain water as set forth in claim 1, wherein the funnel is of inverted pyramidal form having six sides depending to a vertex from which the duct extends to tether the elevated basin to the reservoir, and supported aerially by balloon means at each side thereof.

9. The apparatus for acquiring rain water as set forth in claim 1, wherein the funnel is of inverted pyramidal form depending to a vertex from which the duct extends to tether the elevated basin to the reservoir, and supported aerially by separate balloon means at each side thereof.

10. The apparatus for acquiring rain water as set forth in claim 1, wherein the funnel is of inverted pyramidal form having six sides depending to a vertex from which the duct extends to tether the elevated basin to the reservoir, and supported aerially by separate balloon means at each side thereof.

11. Augmentable apparatus for the acquisition of rain water and including, a multiplicity of modular funnels of polygonal form having coextensive side engageability, a multiplicity of modular balloons and each secured along a side of each funnel together forming a multiplicity of elevated basins tethered at and over a reservoir and with a duct from each of said funnels to said reservoir for the immediate gravitation of acquired rain water into storage.

12. The augmentable apparatus for acquiring rain water as set forth in claim 11, wherein the ducts tether the elevated basins to the reservoir.

13. The augmentable apparatus for acquiring rain water as set forth in claim 11, wherein each funnel module is of inverted pyramidal form depending to a vertex from which a duct extends and supported aerially by said balloon modules at each side thereof.

14. The augmentable apparatus for acquiring rain water as set forth in claim 11, wherein each funnel module is of inverted pyramidal form having six sides depending to a vertex from which a duct extends and supported aerially by said balloon modules at each side thereof.

15. The augmentable apparatus for acquiring rain water as set forth in claim 11, wherein each funnel module is of inverted pyramidal form depending to a vertex from which a duct extends to tether the elevated basin to the reservoir and supported aerially by said balloon modules at each side thereof.

16. The augmentable apparatus for acquiring rain water as set forth in claim 11, wherein each funnel module is of inverted pyramidal form having six sides depending to a vertex from which a duct extends to tether the elevated basin to the reservoir and supported aerially by said balloon modules at each side thereof.

17. Apparatus for the acquisition and storage of rain water and including, a funnel supported aerially by balloon means and together forming an elevated basin tethered at and over a floating reservoir anchored at sea as a mooring for said elevated basin tethered thereto and with a duct from said funnel to said reservoir for the immediate gravitation of acquired rain water into storage.

18. The apparatus for acquiring and storing rain water as set forth in claim 17, wherein the reservoir comprises a floating ring supporting an inflatable membrane separating the acquired rain water from the surrounding saline sea water.

19. The apparatus for acquiring and storing rain water as set forth in claim 17, wherein the reservoir comprises a floating ring supporting inflatable top and bottom membranes separating the acquired rain water from the surrounding saline sea water.

20. The apparatus for acquiring and storing rain water as set forth in claim 17, wherein the reservoir comprises a floating ring supporting an inflatable bottom membrane distended by means from the top membrane to form a sump through which the duct opens into said reservoir.

21. The apparatus for acquiring and storing rain water as set forth in claim 17, wherein the reservoir comprises a floating ring supporting an inflatable bottom membrane distended by an anchor link from a top membrane through which said anchor link extends as part of said mooring.

22. The apparatus for acquiring and storing rain water as set forth in claim 17, wherein the reservoir comprises a floating ring supporting an inflatable bottom membrane distended by an anchor link from the top membrane through which the duct opens into said reservoir and through which said anchor link extends as part of said mooring.

23. Apparatus for the generation of power and storage of acquired rain water and including, a funnel supported aerially by balloon means and together forming an elevated basin tethered at and over a floating reservoir anchored at sea as a mooring for said elevated basin tethered thereto and with a duct from said funnel and discharging through a hydroelectric generator and into said reservoir for the immediate gravitation of acquired rain water into storage.

24. The apparatus for acquiring and storing rain water and generating power as set forth in claim 23, wherein the reservoir comprises a floating buoy supporting the hydroelectric generator.

25. The apparatus for acquiring and storing rain water and generating power as set forth in claim 23, wherein the reservoir comprises a floating ring supporting an inflatable membrane separating the acquired rain water from the surrounding saline sea water, and a floating buoy within said ring and supporting the hydroelectric generator.

26. The apparatus for acquiring and storing rain water and generating power as set forth in claim 23, wherein the reservoir comprises a floating ring supporting inflatable top and bottom membranes separating the acquired rain water from the surrounding saline sea water, and a floating buoy centered within the said ring by said top membrane and supporting the hydroelectric generator.

27. The apparatus for acquiring and storing rain water and generating power as set forth in claim 23, wherein the reservoir comprises a floating ring supporting an inflatable bottom membrane distended by means from a top membrane to form a sump, and a floating buoy centered within said ring by said top membrane and supporting the hydroelectric generator through which the duct opens through said top membrane and into said reservoir.

28. The apparatus for acquiring and storing rain water and generating power as set forth in claim 23, wherein the reservoir comprises a floating ring supporting an inflatable membrane separating the acquired rain water from the surrounding saline sea water, and a floating buoy moored by an anchor link extending therefrom and through said membrane, and the buoy being within said ring and supporting the hydroelectric generator.

29. The apparatus for acquiring and storing rain water and generating power as set forth in claim 23, wherein the reservoir comprises a floating ring supporting inflatable top and bottom membranes separating the acquired rain water from the surrounding saline sea water, and a floating buoy moored by an anchor link extending therefrom and through said membrane, and the buoy being centered within the said ring by said top membrane and supporting the hydroelectric generator.

30. Apparatus for the acquisition and transport of rain water and including, a funnel supported aerially by balloon means and together forming an elevated basin tethered at and over a floating reservoir anchored at sea as a mooring for said elevated basin tethered thereto and with a duct from said funnel to said reservoir for the immediate gravitation of acquired rain water into storage, and a sub-sea aqueduct extending from the said reservoir to a well at a terminus thereof for delivery of said acquired rain water.

31. The apparatus for acquiring and transporting rain water as set forth in claim 30, wherein the sub-sea aqueduct comprises a floating pipe positioned by anchors to extend from said reservoir to said terminus.

32. The apparatus for acquiring and transporting rain water as set forth in claim 30, wherein the sub-sea aqueduct comprises a floating pipe positioned by anchors to extend at an angle of decline from said reservoir to said terminus.

33. The apparatus for acquiring and transporting rain water as set forth in claim 30, wherein the well has a submersible pump for the delivery of said acquired rain water.

34. Apparatus for the generation of power by and for the acquisition and transport of rain water and including, a funnel supported aerially by balloon means and together forming an elevated basin tethered at and over a floating reservoir anchored at sea as a mooring for said elevated basin tethered thereto and with a duct from said funnel and discharging through a hydroelectric generator and into said reservoir for the immediate gravitation of acquired rain water into storage, and a sub-sea aqueduct extending from the said reservoir to a well at a terminus thereof for delivery of said acquired rain water.

35. The apparatus for acquiring rain water, generating power therefrom, storage and transport thereof as set forth in claim 34, wherein the sub-sea aqueduct comprises a floating pipe positioned by anchors to extend with power cables from said reservoir to said terminus.

36. The apparatus for acquiring rain water, generating power therefrom, storage and transport thereof as set forth in claim 34, wherein the sub-sea aqueduct comprises a floating pipe positioned by anchors to extend with power cables at an angle of decline from said reservoir to said terminus.

37. The apparatus for acquiring rain water, generating power therefrom, storage and transport thereof as set forth in claim 34, wherein the sub-sea aqueduct comprises a floating pipe positioned by anchors to extend with cables at an angle of decline from said hydroelectric generator to a submersible pump at the well for the delivery of said acquired rain water.

* * * * *